United States Patent
Lam et al.

(10) Patent No.: US 9,298,390 B2
(45) Date of Patent: Mar. 29, 2016

(54) SYSTEMS AND METHODS FOR COPYING DATA MAINTAINED IN A DYNAMIC STORAGE VOLUME AND VERIFYING THE COPIED DATA

(71) Applicant: Cirrus Data Solutions, Inc., Jericho, NY (US)

(72) Inventors: Wai T. Lam, Jericho, NY (US); Wayne Lam, Jericho, NY (US); Yik Shum Tam, Syosset, NY (US)

(73) Assignee: Cirrus Data Solutions, Inc., Jericho, NY (US)

( * ) Notice: Subject to any disclaimer, the term of this patent is extended or adjusted under 35 U.S.C. 154(b) by 381 days.

(21) Appl. No.: 13/856,955

(22) Filed: Apr. 4, 2013

(65) Prior Publication Data

US 2014/0181440 A1  Jun. 26, 2014

Related U.S. Application Data

(60) Provisional application No. 61/740,910, filed on Dec. 21, 2012.

(51) Int. Cl.
| | |
|---|---|
| *G06F 12/00* | (2006.01) |
| *G06F 3/06* | (2006.01) |
| *G06F 11/10* | (2006.01) |
| *G06F 13/00* | (2006.01) |
| *G06F 13/28* | (2006.01) |
| *G06F 17/30* | (2006.01) |

(52) U.S. Cl.
CPC ............ *G06F 3/065* (2013.01); *G06F 3/067* (2013.01); *G06F 3/0619* (2013.01); *G06F 11/1004* (2013.01); *G06F 3/0647* (2013.01); *G06F 17/30949* (2013.01)

(58) Field of Classification Search
CPC . G06F 3/0647; G06F 17/30949; G06F 3/067; G06F 3/0619
USPC .......................................................... 711/162
See application file for complete search history.

(56) References Cited

U.S. PATENT DOCUMENTS

| | | | | |
|---|---|---|---|---|
| 5,592,618 | A | * | 1/1997 | Micka et al. ..................... 714/54 |
| 6,021,491 | A | * | 2/2000 | Renaud ......................... 713/179 |
| 7,330,960 | B2 | | 2/2008 | Niles et al. |
| 7,996,679 | B2 | * | 8/2011 | Hsu et al. ....................... 713/176 |
| 8,145,860 | B2 | * | 3/2012 | Lam et al. ..................... 711/161 |
| 8,161,254 | B2 | * | 4/2012 | Liu ............................... 711/162 |
| 8,751,761 | B2 | * | 6/2014 | Rossi et al. .................... 711/162 |

* cited by examiner

*Primary Examiner* — Mark Giardino, Jr.
(74) *Attorney, Agent, or Firm* — Lucas & Mercanti, LLP; Jonathan A. Tyler

(57) ABSTRACT

A first volume comprising a plurality of blocks stored in a first location is accessed. A plurality of hash values representing the plurality of blocks is stored. The plurality of blocks is copied to a second volume stored in a second location, generating a copied volume. The copied volume is verified based on the plurality of hash values. In one embodiment, the first volume is altered, after the plurality of hash values is stored. Altering the first volume may include changing data in a selected one of the plurality of blocks. The first volume may be altered during copying of the plurality of blocks to the second volume.

7 Claims, 16 Drawing Sheets

|  | 600 | |
|---|---|---|
|  | 613 | 615 |
| 631 | B-1 | 1 |
| 632 | B-2 | 1 |
| 633 | B-3 | 1 |
| ⋮ | ⋮ | ⋮ |
| 636 | B-N | 1 |

*FIG. 6A*

|  | 600 | |
|---|---|---|
|  | 613 | 615 |
| 631 | B-1 | 0 |
| 632 | B-2 | 0 |
| 633 | B-3 | 0 |
| ⋮ | ⋮ | ⋮ |
| 636 | B-N | 1 |

*FIG. 6B*

|  | 650 | |
|---|---|---|
|  | 663 | 665 |
| 681 | B-1 | 0 |
| 682 | B-2 | 0 |
| 683 | B-3 | 0 |
| ⋮ | ⋮ | ⋮ |
| 686 | B-N | 0 |

| | 650 | |
|---|---|---|
| | 663 | 665 |
| 681 | B-1 | 0 |
| 682 | B-2 | 1 |
| 683 | B-3 | 1 |
| ... | ... | ... |
| 686 | B-N | 0 |

FIG. 6E

| | 600 | |
|---|---|---|
| | 613 | 615 |
| 631 | B-1 | 0 |
| 632 | B-2 | 0 |
| 633 | B-3 | 0 |
| ... | ... | ... |
| 636 | B-N | 0 |

SYSTEMS AND METHODS FOR COPYING DATA MAINTAINED IN A DYNAMIC STORAGE VOLUME AND VERIFYING THE COPIED DATA

This application claims the benefit of U.S. Provisional Patent Application No. 61/740,910, filed on Dec. 21, 2012, which is incorporated herein in its entirety.

TECHNICAL FIELD

This specification relates generally to systems and methods for storing and managing data, and more particularly to systems and methods for copying data maintained in a dynamic storage volume and verifying the copied data.

BACKGROUND

The storage of electronic data, and more generally, the management of electronic data, has become increasingly important. With the growth of the Internet, and of cloud computing in particular, the need for data storage capacity, and for methods of efficiently managing stored data, continue to increase. Many different types of storage devices and storage systems are currently used to store data, including disk drives, tape drives, optical disks, redundant arrays of independent disks (RAIDs), Fibre channel-based storage area networks (SANs), etc.

In many enterprise-level storage systems, it is useful to add data management services to the existing storage system in order to perform one or more desired tasks. For example, it may be useful in some storage systems to add functionality to copy data, to perform a snapshot of a data image, to back up data, to replicate data, to perform data migration from one storage device or system to another, etc. It is also often desirable to be able to verify that any copy made is a valid copy of the original data. Furthermore, it is often desirable to perform such services while causing little or no interruption to the storage system's operations.

SUMMARY

In accordance with an embodiment, a method of verifying copied data is provided. A first volume comprising a plurality of blocks stored in a first location is accessed. A plurality of hash values representing the plurality of blocks is stored. The plurality of blocks is copied to a second volume stored in a second location, generating a copied volume. The copied volume is verified based on the plurality of hash values.

In one embodiment, the first volume is altered, after the plurality of hash values is stored and prior to verification of the copied volume. Altering the first volume may include changing data in a selected one of the plurality of blocks. The first volume may be altered during copying of the plurality of blocks to the second volume.

In another embodiment, the copied volume comprises a plurality of copied blocks. Verifying the copied volume includes generating a second hash value based on a selected one of the plurality of copied blocks and comparing the second hash value to a corresponding hash value in the plurality of hash values.

In accordance with another embodiment, a method of copying data and verifying the copied data is provided. A plurality of blocks is copied from a first volume stored in a first location to a second volume stored in a second location. A plurality of hash values representing the plurality of blocks is stored. A series of actions is performed one or more times, including performing one or more write operations with respect to selected blocks in the first volume during copying of data from the first volume to the second volume, generating one or more updated blocks, updating the plurality of hash values to include one or more updated hash values representing the one or more updated blocks, and copying the one or more updated blocks from the first volume to the second volume. A determination is made that an expected time associated with updating the plurality of hash values to include second updated hash values representing one or more second updated blocks and copying the one or more second updated blocks from the first volume to the second volume is less than a predetermined limit. Input/output operations with respect to the first volume are paused during a selected time period. The plurality of hash values is updated to include the second updated hash values, and the one or more second updated blocks are copied from the first volume to the second volume, during the selected time period.

In one embodiment, the second volume is verified based on the updated plurality of hash values. Verifying the second volume based on the updated plurality of hash values may include generating a verification hash value based on a copied block stored in the second volume and comparing the verification hash value to a hash value selected from the updated plurality of hash values.

In another embodiment, a location of the one or more write operations is recorded in a change map. The plurality of hash values is updated and one or more updated blocks are copied from the first volume to the second volume, based on the change map. A second write operation may be performed with respect to a third selected block in the first volume, generating a third updated block, during copying of the one or more updated blocks. A location of the second write operation is recorded in a second change map. The plurality of hash values is updated and the third updated block is copied from the first volume to the second volume based on the second change map.

In another embodiment, the first volume is stored in a storage system. The storage system is spoofed to obtain information identifying a host entity that has access to the first volume. The host entity is spoofed to access the first volume.

In another embodiment, the first volume is stored in a storage system. The host entity is spoofed during a communication with the storage system to obtain information identifying data that the host entity can access. A determination is made that the host entity has access to the first volume, based on the information.

In accordance with another embodiment, a method of verifying data copied from a dynamic volume is provided. A source volume comprising a plurality of blocks is copied to generate a destination volume. A plurality of digests representing the plurality of blocks is generated. The plurality of digests is updated to include updated digests representing one or more selected blocks of the source volume that were changed during copying of the source volume. The one or more selected blocks are copied to the destination volume, and the destination volume is verified based on the updated plurality of digests.

In one embodiment, the plurality of digests comprises a plurality of hash values. In another embodiment, the digests may comprise cyclic redundancy check values.

In another embodiment, information identifying the selected blocks is recorded in a change map. The plurality of digests is updated and the one or more selected blocks are copied, based on the change map. Information identifying second blocks changed during copying of data from the source volume to the destination volume is recorded in a second change map. A determination is made that an expected time required to update the plurality of digests based on the second blocks, and to copy the second blocks from the source volume to the destination volume, is less than a predetermined limit. Input/output operations with respect to the source volume are paused during a selected time period, in response to the determining. The plurality of digests are updated, based on the second blocks, and the second blocks are copied from the source volume to the destination volume, during the selected time period.

In accordance with another embodiment, a device comprises a memory storing computer program instructions, and a processor. The processor is configured to execute the computer program instructions which, when executed on the processor, cause the processor to perform operations comprising copying a source volume to generate a destination volume, the source volume comprising a plurality of blocks, and generating a plurality of digests representing the plurality of blocks. The operations further comprise updating the plurality of digests to include updated digests representing one or more selected blocks of the source volume that were changed during copying of the source volume, copying to the destination volume the one or more selected blocks, and verifying the destination volume based on the updated plurality of digests.

In accordance with another embodiment, a device located in a path between a switch and a storage system is provided. The device comprises a memory storing computer program instructions, and a processor. The processor is configured to execute the computer program instructions which, when executed on the processor, cause the processor to perform operations comprising spoofing a port of a storage system to obtain information identifying a host entity and a first volume stored in a first storage system that the host entity may access, the first volume comprising a plurality of blocks, and copying the first volume to a second volume stored in a second storage system. The operations also include maintaining a plurality of digests representing the plurality of blocks, updating the second volume and the plurality of digests based on an updated block that is changed during the copying, and verifying the second volume based on the updated plurality of digests.

In accordance with another embodiment, a device located in a path between a switch and a host entity is provided. The device comprises a memory storing computer program instructions, and a processor. The processor is configured to execute the computer program instructions which, when executed on the processor, cause the processor to perform operations comprising spoofing a port of a host entity to obtain information identifying a first volume stored in a first storage system that the host entity may access, the first volume comprising a plurality of blocks, and copying the first volume to a second volume stored in a second storage system. The operations also include maintaining a plurality of digests representing the plurality of blocks, updating the second volume and the plurality of digests based on an updated block that is changed during the copying, and verifying the second volume based on the updated plurality of digests.

These and other advantages of the present disclosure will be apparent to those of ordinary skill in the art by reference to the following Detailed Description and the accompanying drawings.

BRIEF DESCRIPTION OF THE DRAWINGS

FIGS. 6A-6B show a first change map in accordance with an embodiment;

FIGS. 6C-6D show a second change map in accordance with an embodiment;

FIG. 6E shows the first change map of the embodiment of FIGS. 6A-6B after a first pass of a copy procedure has been completed;

DETAILED DESCRIPTION

Methods, systems, and apparatus for copying a volume of data and verifying the copied volume are provided. In one embodiment, a first volume comprising a plurality of blocks stored in a first location is accessed. A plurality of hash values representing the plurality of blocks is stored. The plurality of blocks is copied to a second volume stored in a second location, generating a copied volume. The copied volume is verified based on the plurality of hash values.

In one embodiment, the first volume is altered, after the plurality of hash values is stored. Altering the first volume may include changing data in a selected one of the plurality of blocks. The first volume may be altered during copying of the plurality of blocks to the second volume.

Figure 1A:
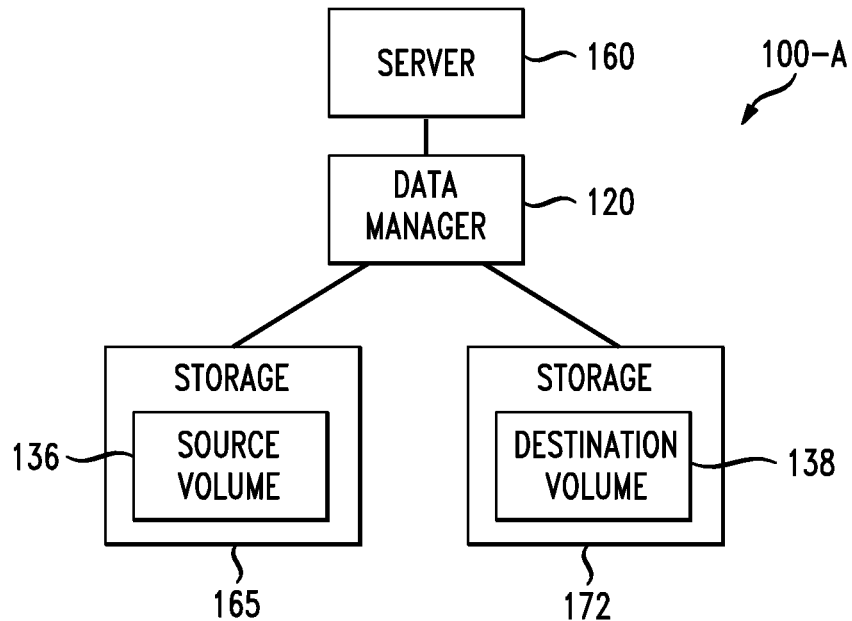
FIG. 1A shows a communication system that may be used to provide data storage services and data management services in accordance with an embodiment.

FIG. 1A shows a communication system 100-A that may be used to provide data storage and data management services in accordance with an embodiment. Communication system 100-A includes a server 160, a data manager 120, a storage 165, and a storage 172.

Data manager 120 is connected to server 160, either directly or via a network. For example, data manager 120 may be connected to server 160 via a Fibre channel network. Data manager 120 is connected to storage 165 and to storage 172, either directly or via one or more networks. For example, data manager 120 may be connected to storage 165 and to storage 172 via a Fibre channel network.

Figure 1B:
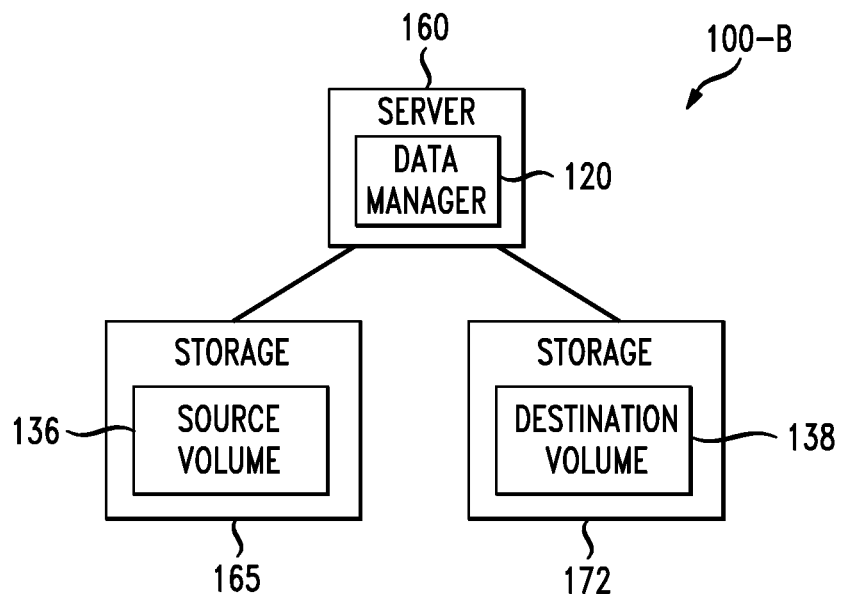
FIG. 1B shows a communication system that may be used to provide data storage services and data management services in accordance with another embodiment.

FIG. 1B shows a communication system 100-B that may be used to provide data storage and data management services in accordance with another embodiment. Communication system 100-B also includes server 160, storage 165, and storage 172. In the embodiment of FIG. 1B, data manager 120 resides and operates on server 160.

Storage 165 stores data. For example, storage 165 may store any type of data, including, without limitation, files, spreadsheets, images, audio files, source code files, etc. Storage 165 may store data in accordance with any suitable format or structure. For example, storage 165 may store data organized in volumes, blocks, files, sectors, etc. Storage 165 may store data in one or more databases or in another data structure. Storage 165 may be implemented, for example, using a storage device, a storage system, or another type of device or apparatus.

In the illustrative embodiment of FIG. 1, storage 165 stores one or more volumes of data.

Storage 165 may from time to time receive, from another entity, a request to store specified data, and in response, store the specified data. For example, storage 165 may store data in response to a request received from server 160. Storage 165 may also from time to time receive, from another entity, a request for access to stored data and, in response, provide the requested data to the requesting entity, or provide access to the requested data. Storage 165 may verify that the requesting entity is authorized to access the requested data prior to providing access to the data.

Storage 172 stores data. For example, storage 172 may store any type of data, including, without limitation, files, spreadsheets, images, audio files, source code files, etc. Storage 172 may store data in accordance with any suitable format or structure. For example, storage 172 may store data organized in volumes, blocks, files, sectors, etc. Storage 172 may store data in one or more databases or in another data structure. Storage 172 may be implemented, for example, using a storage device, a storage system, or another type of device or apparatus.

Storage 172 may from time to time receive, from another entity, a request to store specified data, and in response, store the specified data. For example, storage 172 may store data in response to a request received from server 160. Storage 172 may also from time to time receive, from another entity, a request for access to stored data and, in response, provide the requested data to the requesting entity, or provide access to the requested data. Storage 172 may verify that the requesting entity is authorized to access the requested data prior to providing access to the data.

In the illustrative embodiment of FIG. 1, storage 172 stores one or more volumes of data.

Server 160 may be any computer or other processing device. For example, server 160 may be, without limitation, a personal computer, a laptop computer, a tablet device, a server computer, a mainframe computer, a workstation, a wireless device such as a cellular telephone, a personal digital assistant, etc. Server 160 may from time to time transmit a request to store or retrieve data, or a request for a particular data storage-related service, to storage 165. Server 160 may comprise a display device to display information to a user. Server 160 may also include a mechanism for receiving input from a user, such as a keyboard, a mouse, a touch screen, etc.

Data manager 120 monitors the storage and retrieval of data from storage 165 and 172. In one or more embodiments, data manager 120 may monitor data storage activities transparently. For example, data manager 120 may from time to time detect from server 160 a request for stored data and, in response, perform a selected function. In the embodiment of FIG. 1A, data manager 120 may be implemented using, for example, a server computer, a personal computer, a workstation, a mainframe computer, a tablet computer, a workstation, etc. In the embodiment of FIG. 1B, data manager 120 may be implemented using, for example, a software module that resides on server 160. In other embodiments, data manager 120 may comprise software, hardware, or a combination of software and hardware.

Data manager 120 may also from time to time access selected data and copy the data from a first storage location to a second storage location. For example, data manager 120 may copy a volume of data from storage 165 to storage 172. Alternatively, data manager 120 may copy a volume of data from a first location in a storage system to second location in the same storage system.

In one embodiment, data manager 120 is connected to the Internet and maintains a website that allows a user to manage the operations performed by data manager 120. For example, the website may provide options to store data, copy data, back up data, replicate data, migrate data, etc. When a user selects a particular option, data manager 120 receives the selection and, in response, performs the desired function.

Figure 2:
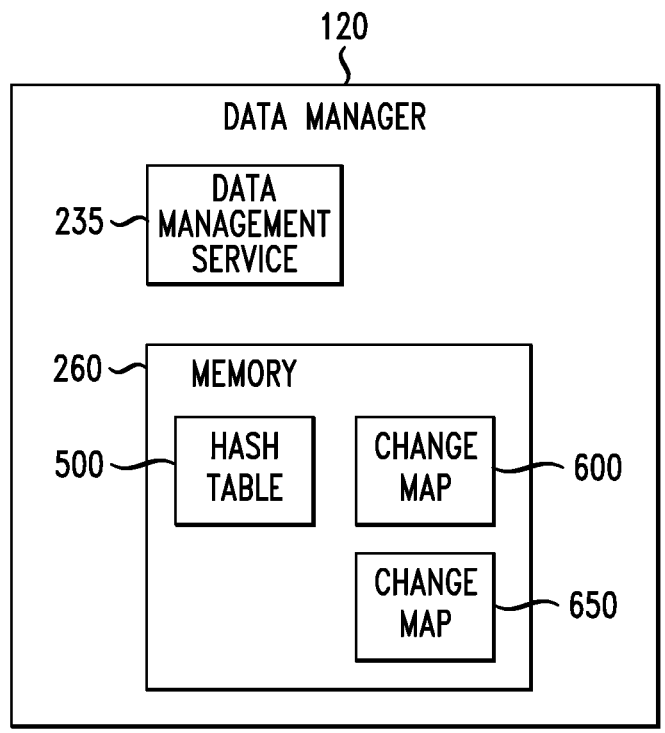
FIG. 2 shows components of a data manager in accordance with an embodiment.

FIG. 2 shows components of data manager 120 in accordance with an embodiment. Data manager 120 comprises a data management service 235 and a memory 260. In other embodiments, data manager 120 may include other components not shown in FIG. 2.

Data management service 235 performs one or more services and other activities relating to data storage. For example, data management service 235 may detect from server 160 a command to store specified data and, in response, perform one or more selected functions.

In the illustrative embodiment, data management service 235 performs a copy function and a verification function. In particular, data management service 235 copies data stored at a first location to a second location, and verifies that the copied data is a valid copy of the original data. For example, data management service 235 may copy data from a first volume stored at a first location to a second volume stored at a second location. In other embodiments, data management service 235 may copy data organized in other formats, such as a selected block of data, a selected sector on a disk, etc., from a first location to a second location. In another embodiment, data management service 235 may copy the contents of a disk drive, tape drive, optical disk, etc., to a second storage location.

Data management service 235 may copy data from a first location to a second location for any of a variety of reasons. For example, a user of server 160 may wish to copy data, back up data, generate a snapshot of data, replicate data, migrate data from a first storage location to a second storage location, etc. Any of these functions may require generating one or more copies of a specified volume of data. In the illustrative embodiment, data management service 235 accesses a specified volume (referred to as the "source volume") at its current storage location and copies the data in the source volume to a second location. The copied data is stored in a second volume referred to as the "destination volume."

After data is copied from a source volume to a destination volume, it is often desirable to verify that the data in the destination volume represents a valid copy of the data in the source volume. For example, if the destination volume represents a complete and accurate copy of the source volume at a particular moment in time, then the destination volume may be considered a valid copy of the source volume (even if the source volume has since changed). Such verification can be important for certain data management functions. For example, a copied destination volume can be used only if it is a valid copy of the source volume. If the source volume is not changed (for example, no write operations have been performed with respect to the source volume since the copy procedure was initiated), the destination volume may be verified by comparing each block in the destination volume to the corresponding block in the source volume.

However, in some instances it is desirable to produce a copy of a dynamic volume of data, i.e., copy the source volume with little or no interruption to input/output operations directed to the source volume, so that users may continue to write data to the source volume during the copy procedure. In such instances, write operations and read operations continue to be performed with respect to the source volume while data is being copied from the source volume to the destination volume. In such cases, it can be challenging to verify that the destination volume is a valid copy of the source volume, because the data in the source volume is altered during the copy procedure by additional write operations. In such cases, verification of the destination volume cannot be accomplished by comparison against the source volume.

In accordance with an embodiment, improved systems, apparatus and methods for copying data and verifying the copied data are provided. Referring to FIG. 1, suppose that, in connection with a particular data storage operation, data manager 120 determines that it is necessary to copy a source volume 136 (stored in storage 165) to storage 172. For example, data manager 120 may determine it necessary to copy source volume 136 to storage 172 in order to perform a snapshot of a data image, back up data, replicate data, perform data migration, or for any other reason. In one embodiment, data manager 120 may determine that it is necessary to copy source volume 165 to storage 172 dynamically, i.e., perform the copy procedure with little or no interruption to the normal operations of storage 165, and allow changes to be made to source volume 136 during the copy procedure.

Copy Procedure

Figure 3:
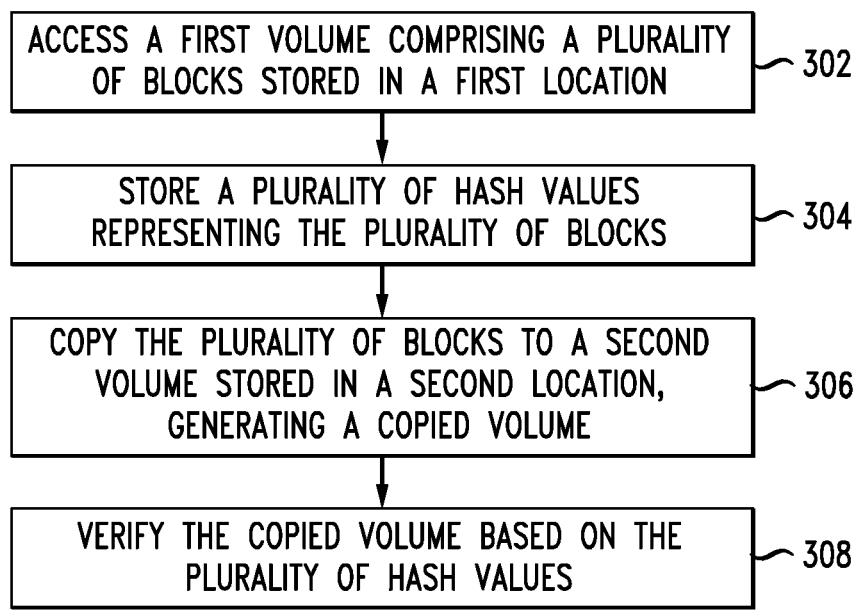
FIG. 3 shows a flowchart of a method of verifying copied data in accordance with an embodiment.

FIG. 3 is a flowchart of a method of verifying copied data in accordance with an embodiment. At step 302, a first volume comprising a plurality of blocks stored in a first location is accessed. Data management service 235 accesses source volume 136 and identifies a plurality of blocks within source volume 136.

Figure 4A:
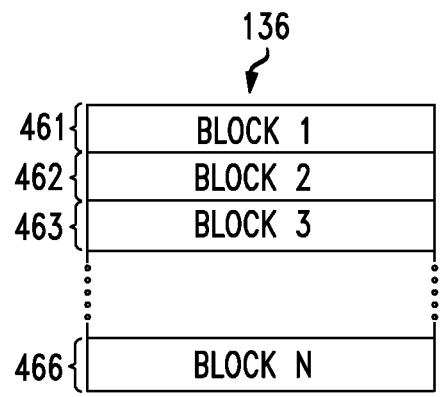
FIG. 4A shows a source volume in accordance with an embodiment.

FIG. 4A shows source volume 136 in accordance with an embodiment. Source volume 136 comprises a plurality of data blocks, including Block 1 (461), Block 2 (462), Block 3 (463), . . . , Block N (466). Each data block contains data.

The terms "data block" and "block" are used interchangeably herein.

When data management service 235 accesses a block in source volume 136, data management service 235 generates a digest representing the block. In one embodiment, data management service 235 accesses a respective block, generates a hash value based on the block, and then copies the block, before accessing another block. Thus, for example, data management service 235 may access a first block (e.g., Block 1 (461)), generate a digest based on the block, then copy the block, and then access a second block (e.g., Block 2 (462)), generate a digest based on the block, then copy the block, etc., until digests have been generated for all blocks and all blocks have been copied.

Any type of digest may be used. In the illustrative embodiment, hash values are used. Thus, data management service 235 employs a hash function to generate a hash value based on each of Block 1 through Block N of source volume 136, as the respective blocks are accessed. Hash functions and hash values, and the use of hash functions to generate hash values, are known. Examples of hash functions that may be used to generate hash values include, without limitation, the message digest 5 (MD5) algorithm and the secure hash (SHA-1) algorithm. The MD5 algorithm and the SHA-1 algorithm are known. Other hash functions may be used. In other embodiments, other methods may be used to generate a digest representing a particular data block of source volume 136. For example, in some embodiments, cyclic redundancy check (CRC) values may be used.

For example, in one embodiment, when data management service 235 retrieves Block 1 (461) from source volume 136, data management service 235 may apply the MD5 algorithm to Block 1 (461) to generate a first hash value. Similarly, when data management service 235 retrieves Block 2 (462) from source volume 136, data management service 235 applies the MD5 algorithm to Block 2 (462) to generate a second hash value. Data management service 235 may similarly apply the MD5 algorithm to each block retrieved from source volume 136 to generate a hash value, prior to copying the block to destination volume 138.

Figure 4B:
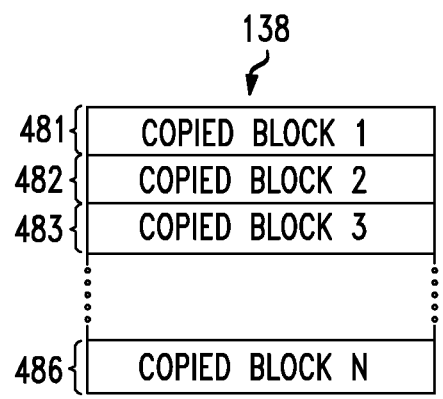
FIG. 4B shows a destination volume in accordance with an embodiment.
Figure 4C:
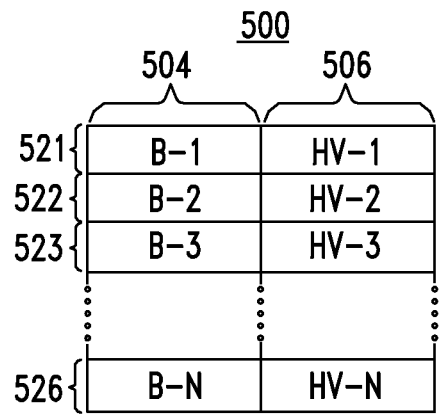
FIG. 4C shows a hash table in accordance with an embodiment.

At step 304, a plurality of hash values representing the plurality of blocks is stored. Data management service 235 stores the hash values in a memory. In one embodiment, data management service 235 stores the hash values in a hash table. FIG. 4C shows a hash table 500 in accordance with an embodiment. Hash table 500 includes two columns 504 and 506. Column 504 stores an identifier of a respective block stored in source volume 136. Column 506 stores a hash value associated with the block identified in column 504. Thus, record 521 holds identifier B-1 identifying Block 1 (461), and a hash value HV-1 associated with Block 1 (461). Similarly, record 522 holds identifier B-2 identifying Block 2 (462) and a hash value HV-2 associated with Block 2 (462). Record 523 holds identifier B-3 identifying Block 3 (463) and a hash value HV-3 associated with Block 3 (463). Record 526 holds identifier B-N identifying Block N (466) and a hash value HV-N associated with Block N (466). In the illustrative embodiment, hash table 500 is stored in memory 260 of data manager 120, as shown in FIG. 2.

While the illustrative embodiment of FIG. 4C uses a hash table to store hash values, in other embodiments, hash values may be stored using other data structures.

At step 306, the plurality of blocks is copied to a second volume stored in a second location, generating a copied volume. Data management service 235 copies Block 1 (461) through Block N (466) from source volume 136 to storage 172. In the illustrative embodiment of FIG. 1, data management service 235 stores the copied blocks in a destination volume 138 (in storage 172). FIG. 4B shows destination volume 138 in accordance with an embodiment. Data management service 235 stores a copy of Block 1 (461) in destination volume 138 as Copied Block 1 (481), a copy of Block 2 (462) in destination volume 138 as Copied Block 2 (482), a copy of Block 3 (463) in destination volume 138 as Copied Block 3 (483), a copy of Block N (466) in destination volume 138 as Copied Block N (486), etc.

In one embodiment, source volume 136 is maintained as a dynamic volume during the copy procedure. Thus, changes continue to be made to source volume 136 while data manager 120 copies the data in source volume 136 to destination volume 138. As a result, source volume 136 may not be used at a later time to verify the data in destination volume 138.

Advantageously, the hash values stored in hash table 500 represent the blocks of source volume 136 at the time they were copied. Accordingly, the hash values may optionally be used at a later time to verify the data stored in destination volume 138.

Verification Procedure

As discussed above, it is often desirable to verify that a copied volume is a valid copy of the source volume. For example, a copied volume can be used only if the copied volume is a valid copy. However, verifying that a copied volume is a valid copy can be challenging when the source volume is dynamic and is changed while the copy procedure is being performed. In accordance with various embodiments, the hash values stored in hash table 500 may optionally be used to verify the data stored in destination volume 138.

Thus, in one embodiment, data management service 235 uses hash table 500 to verify destination volume 138. Referring again to FIG. 3, at step 308, the copied volume is verified based on the plurality of hash values. Data management service 235 retrieves a block from destination volume 138 and generates a verification hash value based on the retrieved block. For example, referring to FIG. 4B, data management service 235 may access destination volume 138 and retrieve Copied Block 1 (481). Data management service 235 applies a hash function to the block and generates a verification hash value. In the illustrative embodiment, the same hash function that was used previously to generate the hash values stored in hash table 500 is used to generate verification hash values.

Data management service 235 also accesses hash table 500 and retrieves the hash value from the record corresponding to the retrieved block. In the illustrative embodiment, data management service 235 determines that record 521 of hash table 500 is associated with Block 1 (461), and therefore corresponds to Copied Block 1 (481). Data management service 235 accordingly retrieves hash value HV-1 from record 521.

Data management service 235 compares the verification hash value to the hash value retrieved from hash table 500. If the two values are identical, data management service 235 determines that Copied Block 1 (481) is a valid copy of the corresponding block in source volume 136.

Data management service 235 next retrieves Copied Block 2 (482), generates a verification hash value, and compares the verification hash value to HV-2 (stored in record 522, which corresponds to Copied Block 2 (482). If the two values are identical, data management service 235 determines that Copied Block 2 (482) is a valid copy of the corresponding block in source volume 136.

Data management service 235 verifies each block in destination volume 138 in the manner described above. If all of the blocks are valid, data management service 235 determines that destination volume 138 is a valid copy of source volume 136. If one or more of the blocks are not valid, then data management service 235 concludes that destination volume 138 is not a valid copy of source volume 136.

As stated above, the step of verifying the copied volume based on the copied volume is optional. In another embodiment, step 308 may be omitted.

Other Implementations

In accordance with another embodiment, a method of verifying data copied from a dynamic volume is provided. A source volume comprising a plurality of blocks is copied to generate a destination volume. A plurality of digests representing the plurality of blocks is generated. The plurality of digests is updated to include updated digests representing one or more selected blocks of the source volume that were changed during copying of the source volume. The one or more selected blocks are copied to the destination volume, and the destination volume is verified based on the updated plurality of digests.

Figure 5A:
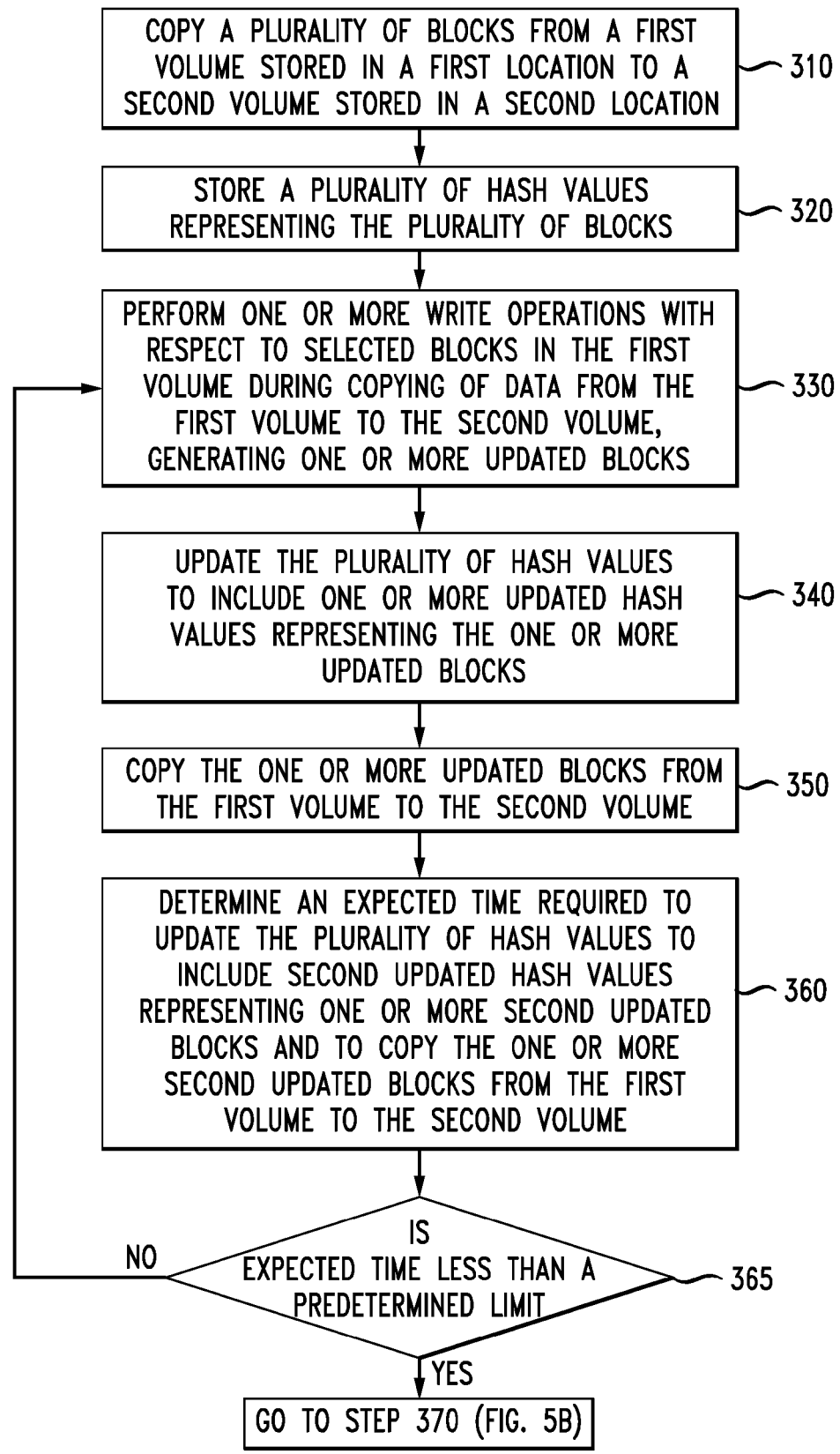
FIGS. 5A-5B show a flowchart of a method of copying data and verifying the copied data in accordance with an embodiment.
Figure 5B:
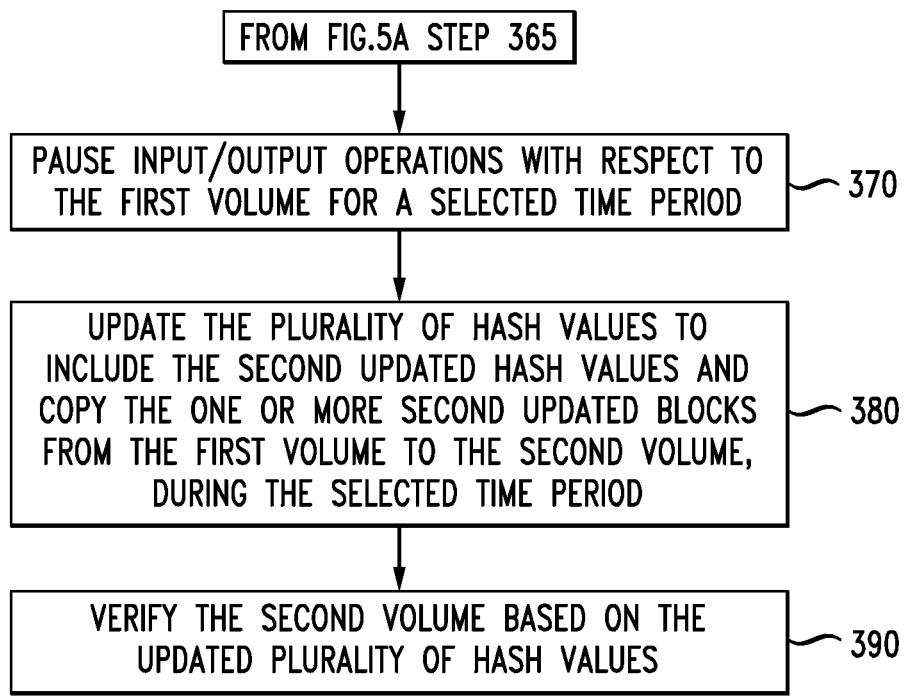

FIGS. 5A-5B show a flowchart of a method of copying data and verifying the copied data in accordance with an embodiment. At step 310, a plurality of blocks is copied from a first volume stored in a first location to a second volume stored in a second location. As discussed in the illustrative embodiment described above, data manager 120 copies source volume 136 to destination volume 138. At step 320, a plurality of hash values representing the plurality of blocks is stored. As discussed in the illustrative embodiment, data manager 120 stores hash values representing the blocks of source volume 136 in hash table 500.

This portion of the copy procedure, i.e., generating hash values corresponding to each block of source volume 136, and copying each block of source volume 136 to destination volume 138, is referred to as the "first pass" of the copy procedure.

In the illustrative embodiment, source volume 136 is maintained as a dynamic volume during the copy procedure. Therefore, input/output operations, including write operations, continue to be performed with respect to source volume 136 while source volume 136 is being copied to storage 172. In order to allow source volume 136 to be changed during the copy procedure while ensuring that the copy procedure produces a valid copy of source volume 136, the series of actions described below with reference to steps 330, 340, and 350 of FIGS. 5A-5B may be performed one or more times.

Referring again to the method of FIGS. 5A-5B, at step 330, one or more write operations are performed with respect to selected blocks in the first volume during copying of data from the first volume to the second volume, generating one or more updated blocks. For example, in the illustrative embodiment, a write operation is performed with respect to Block 2 (462) of source volume 136, after Block 2 (462) has been copied to destination volume 138, resulting in a changed, or updated, Block 2 (462) within source volume 136.

Change Maps

In order to monitor changes made to source volume 136 during the copy procedure, data management service 235 generates and maintains one or more change maps indicating the locations of changes made to source volume 136. In the illustrative embodiment, data management service 235 generates a first change map 600 and a second change map 650, which are stored in memory 260, as shown in FIG. 2. In other embodiments, other mechanisms for keeping track of changes may be used.

FIG. 6A shows a first change map in accordance with an embodiment. First change map 600 includes two columns 613 and 615. Column 613 stores identifiers of respective blocks within source volume 136. Column 615 includes information indicating whether or not the corresponding block needs to be copied. In the illustrative embodiment, prior to commencing the first pass, data management service 235 initializes first change map 600 by inserting a "1" in column 615 of each record, as shown in FIG. 6A. Inserting a "1" in column 615 of each record indicates that each data block in source volume 136 must be copied to destination volume 138.

Referring to FIG. 6A, record 631 stores information related to Block 1 (461). Specifically, record 631 contains an identifier "B-1" that identifies Block 1 (461) of source volume 136. Record 631 has a "1" in column 615, indicating that Block 1 (461) must be copied. Record 632 indicates that Block 2 (462)

of source volume 136, identified by the identifier "B-2," must be copied (indicated by a "1" in column 615). Record 633 indicates that Block 3 (463) of source volume 136, identified by the identifier "B-3," must be copied (indicated by a "1" in column 615). Record 636 indicates that Block N (466) of source volume 136, identified by the identifier "B-N," must be copied (indicated by a "1" in column 615).

During the first pass of a copy procedure, data management service 235 consults first change map 600 to identify blocks which must be copied from source volume 136 to destination volume 138. Data management service 235 examines column 615 of each record of change map 600 to determine if the corresponding block must be copied. If column 615 of a particular record contains a "1," then data management service 235 copies the corresponding block of source volume 136 to destination volume 138.

Data management service 235 updates first change map 600 when a particular block of source volume 136 is copied to destination volume 138, by inserting a "0" in column 615 of the appropriate record. For example, after data management service 235 copies Block 1 (461) from source volume 136 to destination volume 138, data management service 235 inserts a "0" in column 615 of record 631 of first change map 600, as shown in FIG. 6B. Similarly, after data management service 235 copies Block 2 (462) from source volume 136 to destination volume 138, data management service 235 inserts a "0" in column 615 of record 632 of first change map 600, as shown in FIG. 6B. After data management service 235 copies Block 3 (463) from source volume 136 to destination volume 138, data management service 235 inserts a "0" in column 615 of record 633 of first change map 600, as shown in FIG. 6B. FIG. 6B shows first change map 600 at an intermediate stage of the first pass, when some blocks (including Blocks B-1, B-2, B-3) have been copied to destination volume 138, while other blocks (including Block B-N) have not been copied.

As discussed above, while the data blocks of source volume 136 are being copied to destination volume 138 (during the first pass), write operations may be performed with respect to source volume 136, causing one or more data blocks to be changed. If a block is changed after it has been copied during the first pass, then it is necessary to copy the block again to ensure that destination volume 138 is a valid copy of source volume 136. Data management service 235 uses second change map 650 to identify blocks that are changed after being copied from source volume 136 to destination volume 138 (and which must therefore be copied again).

FIG. 6C shows second change map 650 in accordance with an embodiment. Second change map 650 comprises a first column 663 and a second column 665. Column 663 includes an identifier of a respective block of source volume 136. Thus, referring to FIG. 6C, record 681 holds information relating to Block 1 (461), identified by the identifier "B-1." Record 682 holds information relating to Block 2 (462), identified by the identifier "B-2." Record 683 holds information relating to Block 3 (463), identified by the identifier "B-3." Record 686 holds information relating to Block N (466), identified by the identifier "B-N."

Column 665 of second change map 650 holds information indicating whether the respective data block has been changed after being copied (and therefore needs to be copied again). In the illustrative embodiment, prior to performing the first pass, data management service 235 initializes second change map 650 by inserting a "0" in column 665 of each record. Thus, referring to FIG. 6C, records 681, 682, 683, . . . , 686 all contain a "0" in column 665.

During the first pass, if a write operation is performed with respect to a particular block in source volume 136 after that particular block has been copied to destination volume 138 (a "0" in column 615 of first change map 600 indicates that the corresponding block has been copied), data management service 235 inserts a "1" in column 665 of the appropriate record of second change map 650. By updating second change map 650 in this manner while completing the first pass of the copy procedure, data management service 235 produces an initial copy of source volume 136, and generates a list of blocks that have been changed since being copied and which therefore must be copied again to destination volume 138.

Figure 7A:
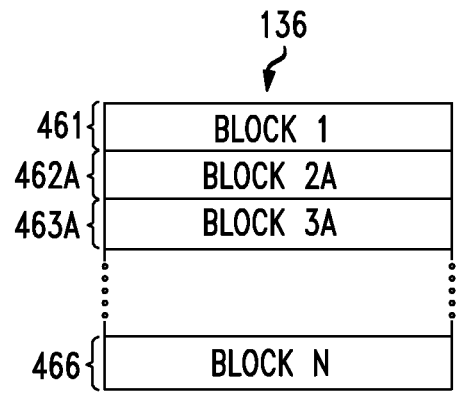
FIG. 7A shows the source volume of FIG. 4A after several write operations have been performed.

FIG. 7A shows source volume 136 after a write operation has been performed with respect to Block 2 (462). Block 2 (462) has been altered and is now represented in FIG. 7A as an updated Block 2A (462A).

In the illustrative embodiment, when the write operation is performed with respect to Block 2 (462) of source volume 136, data management service 235 accesses first change map 600 and determines whether or not Block 2 (462) has been copied. Referring to FIG. 6B, data management service 235 examines record 632 (which corresponds to Block 2 (462)) and determines that column 615 contains a "0." Data management service 235 therefore concludes that Block 2 (462) has already been copied during the first pass. Data management service 235 accordingly accesses second change map 650 and inserts a "1" in column 665 of record 682 (which corresponds to Block 2 (462)), as shown in FIG. 6D.

Suppose further that another write operation is performed with respect to Block 3 (463) of source volume 136 after Block 3 (463) has been copied from source volume 136 to destination volume 138. Referring again to FIG. 7A, Block 3 (463) has been altered and is now represented in FIG. 7A as an updated Block 3A (463A).

When the write operation is performed with respect to Block 3 (463) of source volume 136, data management service 235 accesses first change map 600 and determines whether or not Block 3 (463) has been copied. Referring to FIG. 6B, data management service 235 examines record 633 (which corresponds to with Block 3 (463)) and determines that column 615 contains a "0," indicating that the block has been copied. Data management service 235 accordingly accesses second change map 650 and inserts a "1" in column 665 of record 683 (which corresponds to Block 3 (463)). FIG. 6D shows second change map 650 after records 682 and 683 have been updated to indicate that Block 2 (462) and Block 3 (463) have been changed after having been copied to destination volume 138.

Data management service 235 continues to copy data blocks from source volume 136 to destination volume 138 until the first pass is complete (i.e., all blocks in source volume 136 have been copied to destination volume 138). Data management service 235 continues to update hash table 500, first change map 600, and second change map 650 as the copying is performed. FIG. 6E shows first change map 600 after the first pass has been competed. All records in first change map 600 now contain a "0" in column 615, indicating that all of the blocks in source volume 136 have been copied to destination volume 138.

After the first pass of the copy procedure is complete (i.e., Block 1 through Block N have been copied from source volume 136 to destination volume 138), data management service 235 performs a "second pass" based on second change map 650 to ensure that those blocks that were changed after being copied are copied again.

At step 340, the plurality of hash values is updated to include one or more updated hash values representing the one or more updated blocks. Data management service 235 examines column 665 of second change map 650 to identify blocks that were changed after being copied. In the illustrative embodiment, data management service 235 determines that records 682 and 683 contain a "1" in column 665, and concludes that Block 2 (462) and Block 3 (463) were changed after being copied. Data management service 235 therefore determines that Block 2 (462) and Block 3 (463) must be copied again to destination volume 138. If a record contains a "0" in column 665, there is no need to copy the corresponding block again.

Figure 8:
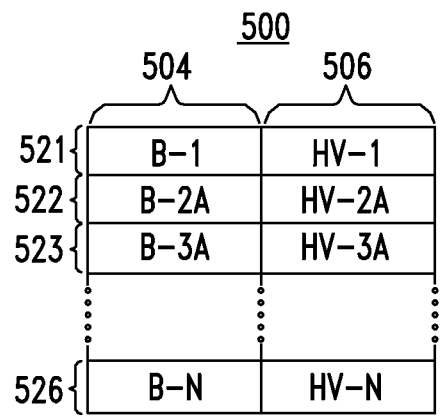
FIG. 8 shows the hash table of FIG. 4C after several hash values have been updated.

Data management service 235 generates an updated hash value based on updated Block 2A (462A), generating updated hash value HV-2A. Data management service 235 stores the updated hash value HV-2A in record 522 of hash table 500, as shown in FIG. 8. In one embodiment, the previous hash value HV-2 is removed from hash table 500. Data management service 235 also generates an updated hash value based on updated Block 3A (463A), generating a hash value HV-3A. Data management service 235 stores the hash value HV-3A in record 523 of hash table 500, as shown in FIG. 8. The previous hash value HV-3 may be removed from hash table 500.

Figure 7B:
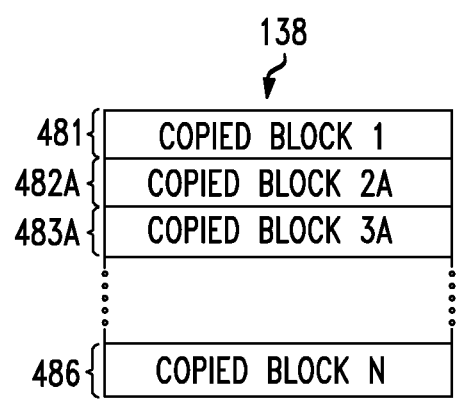
FIG. 7B shows the destination volume of FIG. 4B after several copied blocks have been updated.

At step 350, the one or more updated blocks are copied from the first volume to the second volume. Data management service 235 accesses source volume 136 (now containing updated Block 2A (462A) and updated Block 3A (463A) as shown in FIG. 7A), and copies updated Block 2A (462A) to destination volume 138. FIG. 7B shows destination volume 138 after updated Block 2A (462A) has been copied from source volume 136. Destination volume 138 now includes updated Copied Block 2A (482A). Data management service 235 also copies updated Block 3A (463A) to destination volume 138, as shown in FIG. 7B. Destination volume 138 now includes updated Copied Block 3A (463A).

The roles of first change map 600 and second change map 650 may be reversed during the second pass. If a data block of source volume 136 is changed during the second pass, data management service 235 may consult second change map 650. If column 665 of the appropriate record of second change map 650 holds a "0," then data management service 235 records the location of the change in first change map 600, by inserting a "1" in column 615 of the appropriate record of first change map 600 (indicating that the corresponding block must be copied again). Thus, while data management service 235 is copying Block 2A (462A) and Block 3A (463A) to destination volume 138, the locations of changes made to source volume 136 may be recorded in first change map 600. After the second pass is complete, data management service 235 may examine first change map 600 to determine whether any blocks must be copied again. If first change map 600 indicates that one or more blocks must be copied again, then data management service 235 may use the information in first change map 600 to complete a third pass. Second change map 650 may then again be used to record locations of changes made to source volume 136 during the third pass. Further passes may be performed, as necessary. Data management service 235 may alternate between using first change map 600 and second change map 650 to record the locations of changes, in order to perform multiple passes.

Under most conditions, it can be expected that the number of data blocks that must be copied during a respective pass of a copy procedure will be less than the number of blocks copied during the previous pass. Similarly, under most conditions it may be expected that the time required to complete a respective pass will be less than the time that was required to complete the previous pass. In one embodiment, data management service 235 performs multiple passes until the expected time required to complete a respective pass is less than a predetermined limit. For example, the predetermined limit may be selected to be a time period for which it is acceptable to pause input/output operations with respect to source volume 136. For example, the predetermined time period may be one second.

Thus, at step 360, an expected time associated with updating the plurality of hash values to include second updated hash values representing one or more second updated blocks and copying the one or more second updated blocks from the first volume to the second volume is determined. In the illustrative embodiment, prior to performing each pass of the copy procedure, data management service 235 determines an expected time required to completed the pass.

Referring to block 365, if the expected time is not less than the predetermined limit, the method returns to step 330 (and another pass is performed). If the expected time is less than the predetermined limit, the method proceeds to step 370 (of FIG. 5B).

At step 370, input/output operations with respect to the first volume are paused for a selected time period. Accordingly, when the expected time required to complete the next pass is less than the predetermined limit, data management service 235 pauses input/output operations with respect to source volume 136 for a selected time period that is at least equal to the predetermined limit.

At step 380, the plurality of hash values is updated to include the second updated hash values and the one or more second updated blocks are copied from the first volume to the second volume, during the selected time period. Data management service 235 now completes a final pass (i.e., by updating hash table 500 based on the changed blocks and copying the blocks indicated in the relevant change map). After the final pass, the copy procedure may be considered complete. After the final pass (or after the selected time period ends), input/output operations may resume.

At step 390, the second volume is verified based on the updated plurality of hash values. Data management service 235 retrieves a block from destination volume 138 and generates a verification hash value based on the retrieved block. For example, referring to FIG. 4B, data management service 235 may access destination volume 138 and retrieve Copied Block 1 (481). Data management service 235 applies a hash function to the block and generates a verification hash value. In the illustrative embodiment, the same hash function that was used previously to generate the hash values stored in hash table 500 is used to generate verification hash values.

Data management service 235 also accesses (updated) hash table 500 (as shown in FIG. 8) and retrieves the hash value from the record corresponding to the retrieved block. In the illustrative embodiment, data management service 235 determines that record 521 of (updated) hash table 500 is associated with Block 1 (461), and therefore corresponds to Copied Block 1 (481). Data management service 235 accordingly retrieves hash value HV-1 from record 521.

Data management service 235 compares the verification hash value to the hash value retrieved from hash table 500. If the two values are identical, data management service 235 determines that Copied Block 1 (481) is a valid copy of the corresponding block in source volume 136.

Data management service 235 next retrieves Copied Block 2 (482), generates a verification hash value, and compares the verification hash value to HV-2A (stored in record 522, which corresponds to Copied Block 2 (482)). If the two values are identical, data management service 235 determines that Copied Block 2 (482) is a valid copy of the corresponding block in source volume 136.

Data management service 235 verifies each block in destination volume 138 in the manner described above. If all of the blocks are valid, data management service 235 determines that destination volume 138 is a valid copy of source volume 136. If one or more of the blocks are not valid, then data management service 235 concludes that destination volume 138 is not a valid copy of source volume 136.

Interceptor Appliance

Methods, systems and apparatus described herein may be implemented in a variety of environments and for a variety of purposes. More specifically, in various embodiments, a data manager such as data manager 120, may be used in a network to copy a selected source volume comprising a plurality of blocks to a destination volume, generate a plurality of digests representing the plurality of blocks, update the plurality of digests to include updated digests representing one or more selected blocks of the source volume that were changed during copying of the source volume, copy the one or more selected blocks to the destination volume, and verify the destination volume based on the updated plurality of digests.

Figure 9:
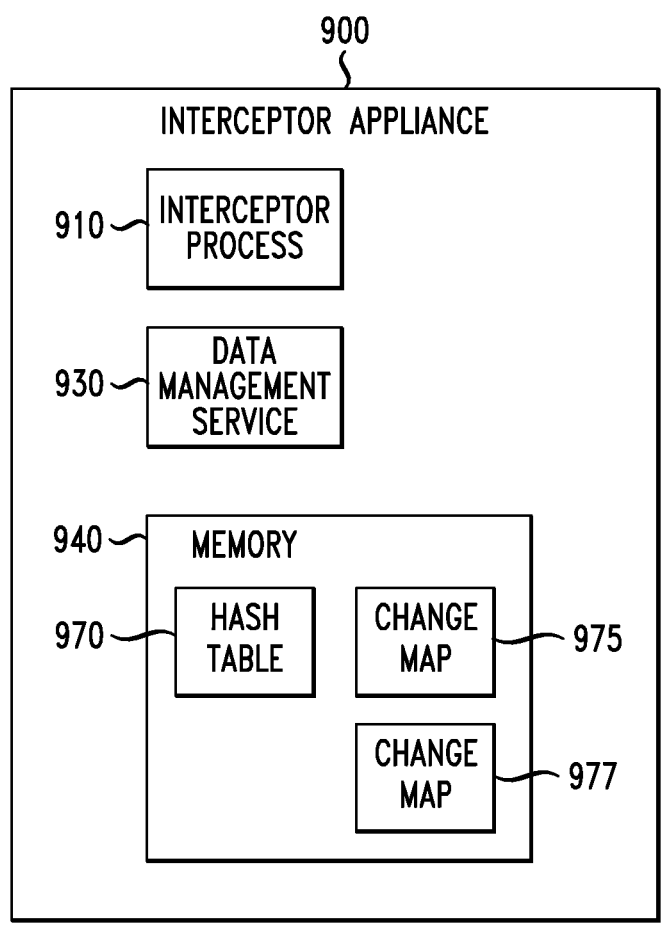
FIG. 9 shows an interceptor appliance in accordance with an embodiment.

In accordance with one embodiment, a data manager such as data manager 120 may be implemented using a device such as that shown in FIG. 9. Interceptor appliance 900 comprises a data management service 930 and a memory 940. Data management service 930 and memory 940 correspond respectively to data management service 235 and memory 260 shown in the embodiment of FIG. 2. Interceptor appliance 900 also comprises an interceptor process 910.

In accordance with an embodiment, interceptor appliance 900 is inserted, or installed, at a selected location in a network. Interceptor process 910 communicates with one or more devices or other components in the network to obtain information identifying a host entity (which may be, for example, a server), and further to obtain information identifying data that is stored in a storage system and which the host entity may access. Several network configurations in which interceptor appliance 900 may be used are shown in FIGS. 10, 12, 14, and 15. Other network configurations may be used.

Examples of systems, methods, and apparatus for using a device such as interceptor appliance 900 to obtain information identifying a host entity, and to obtain information identifying data that is stored in a storage system and which the host entity may access, are described in U.S. patent application Ser. No. 13/725,326, filed Dec. 21, 2012 and entitled "Systems, Apparatus, and Methods for Identifying Stored Data That May be Accessed by a Host Entity and Providing Data Management Services," U.S. patent application Ser. No. 13/556,726, filed Jul. 24, 2012 and entitled "Systems and Methods for Intercepting Data Relating to Storage Volume Access," and U.S. Pat. No. 8,255,538, dated Aug. 28, 2012 and entitled "Systems and Methods for Intercepting Data Relating to Storage Volume Access," each of which is incorporated by reference herein in its entirety.

Figure 10:
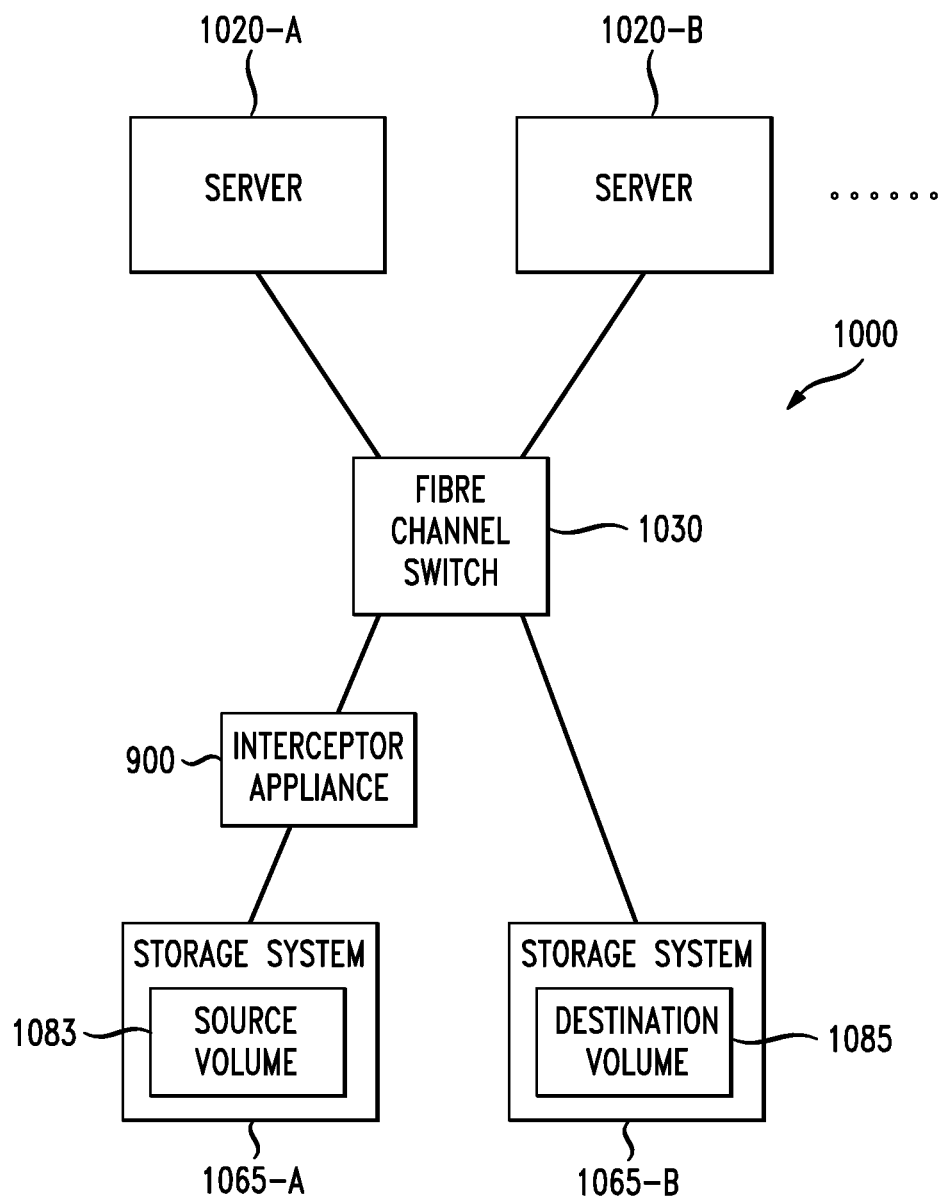
FIG. 10 shows a communications system in accordance with an embodiment.

FIG. 10 shows a communications system in accordance with one embodiment. Communication system 1000 comprises a Fibre channel network that includes a Fibre channel switch 1030, which is connected to servers 1020-A and 1020-B. Fibre channel switch 1030 is also connected to storage systems 1065-A and 1065-B. While two servers are shown in the embodiment of FIG. 10, more or fewer than two servers may be used. Similarly, while two storage systems are shown in the embodiment of FIG. 10, more or fewer than two storage systems may be used.

In the embodiment of FIG. 10, each component, including servers 1020, Fibre channel switch 1030, interceptor appliance 900 and storage systems 1065, comprises one or more ports, which are used for communications with other devices. Each respective port has an identifier, such as a world wide port name.

Figure 11:
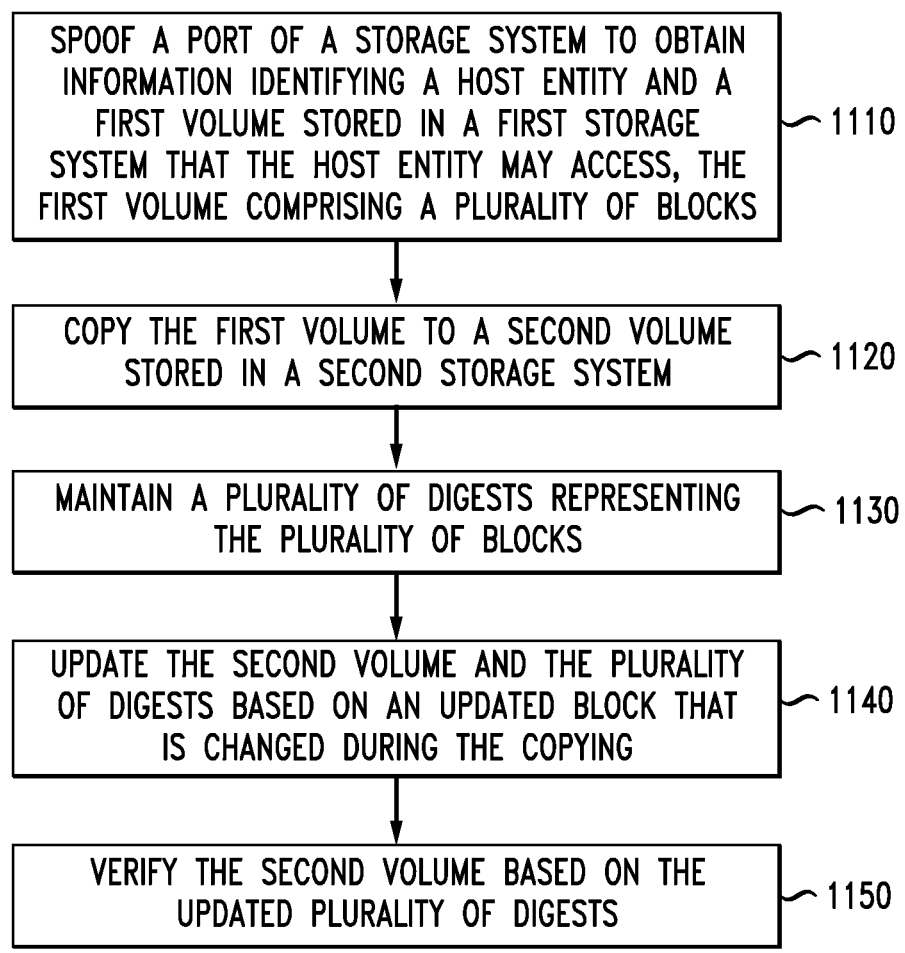
FIG. 11 is a flowchart of a method of copying data and verifying the copied data in accordance with an embodiment.

In the embodiment of FIG. 10, interceptor appliance 900 is inserted between, and is connected to, Fibre channel switch 1030 and storage system 1065-A. Interceptor process 910 (of interceptor appliance 900) spoofs selected components of network 1000 to obtain information concerning one or more host entities in the network and data stored in one or more storage systems in the network. For example, interceptor appliance 900 may identify server 1020-A, and identify a volume stored in storage system 1065-A to which server 1020-A has access. Interceptor appliance may then copy the identified volume and verify that the copied volume is a valid copy of the identified volume. FIG. 11 is a flowchart of a method of copying data and verifying the copied data in accordance with an embodiment.

At step 1110, a port of a storage system is spoofed to obtain information identifying a host entity and a first volume stored in the storage system that the host entity may access, the first volume comprising a plurality of blocks. In the illustrative embodiment of FIG. 10, interceptor process 910 (of interceptor appliance 900) identifies a target world wide port name of a target port of storage system 1065-A during a communication with storage system 1065-A. Interceptor process 910 then uses the target world wide port name to spoof the target port and register a selected port of interceptor appliance 900 with Fibre channel switch 1030, based on the target world wide port name, in a first registration procedure. Interceptor appliance 900 then receives registration information identifying an initiator world wide port name of a port of a host entity, such as server 1020-A, that is zoned to the target port of storage system 1065-A, in a second registration procedure. Interceptor process 910 then uses the initiator world wide port name to spoof the initiator port, and identifies one or more storage volumes in storage system 1065-A which server 1020-A may access, based on the initiator world wide port name. For example, in the illustrative embodiment of FIG. 10, interceptor appliance 900 may determine that server 1020-A has access to source volume 1083 stored in storage system 1065-A.

Interceptor appliance 900 may now employ systems, apparatus, and methods described herein to copy source volume 1083 to storage system 1065-B while allowing input/output operations directed to source volume 1083 to continue with little or no interruption. Referring again to the method described in FIG. 11, at step 1120, the first volume is copied to a second volume stored in a second storage system. Thus, data management service 930 (of interceptor appliance 900) identifies data blocks in source volume 1083 and commences a copy procedure to copy the data of source volume 1083 to a destination volume 1085 stored in storage system 1065-B, as shown in FIG. 10. In a first pass of the copy procedure, data management service 930 copies each of the blocks from source volume 1083 to destination volume 1085.

At step 1130, a plurality of digests representing the plurality of blocks is maintained. Using systems and methods described herein, data management service 930 generates a hash value for each respective block copied during the first pass. Hash values are stored in a hash table 970 maintained in memory 940 (of interceptor appliance 900), as shown in FIG. 9.

At step 1140, the second volume and the plurality of digests are updated based on an updated block that is changed during the copying. Data management service 930 maintains a first change map 975 and a second change map 977 in memory 940, as shown in FIG. 9, to keep track of changes made to source volume 1083 during each successive pass of the copy procedure. In the manner described herein, data management service 235 may use first change map 975 to complete a first pass of the copy procedure. During the first pass, data management service 235 may record the locations of changes made to source volume 1083 in second change map 977. After a first pass is completed, data management service 930 identifies blocks that were changed during the first pass, based on second change map 977, and copies the identified blocks in a second pass. Updated hash values are generated for each of the blocks copied during the second pass, and hash table 970 is updated to include the updated hash values. Changes made to source volume 136 during the second pass are recorded in first change map 975. Additional passes are performed, as necessary, until a final pass is completed and a valid copy is generated.

At step 1150, the second volume is verified based on the updated plurality of digests. After data management service 930 completes the final pass of the copy procedure, data management service 930 may use hash table 970 to verify that destination volume 1085 is a valid copy of source volume 1083, in the manner described herein. Similar methods may be used to identify, copy, and verify data stored in storage system 1065-A or 1065-B that may be accessed by server 1020-B.

Figure 12:
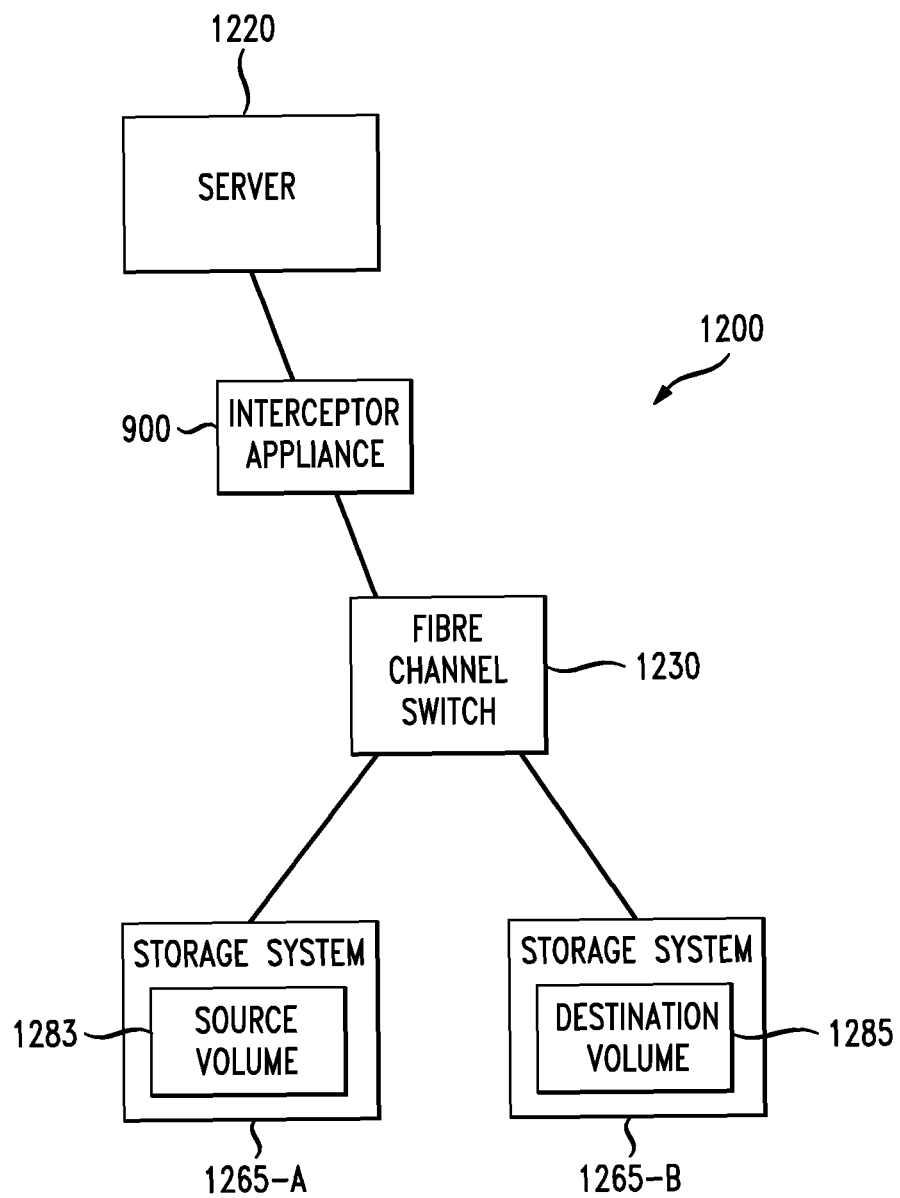
FIG. 12 shows a communications system in accordance with an embodiment.

Other arrangements may be used. For example, FIG. 12 shows a communications system in accordance with another embodiment. Communication system 1200 comprises a Fibre channel network that includes a Fibre channel switch 1230. Fibre channel switch 1230 is connected to storage systems 1265-A and 1265-B. Interceptor appliance 900 is inserted in between Fibre channel switch 1230 and a server 1220. While one server is shown in the embodiment of FIG. 12, more than one server may be used. Similarly, while two storage systems are shown in the embodiment of FIG. 12, more or fewer than two storage systems may be used.

In the embodiment of FIG. 12, each component, including server 1220, Fibre channel switch 1230, interceptor appliance 900 and storage systems 1265, comprises one or more ports, which are used for communications with other devices. Each respective port has an identifier, such as a world wide port name.

Figure 13:
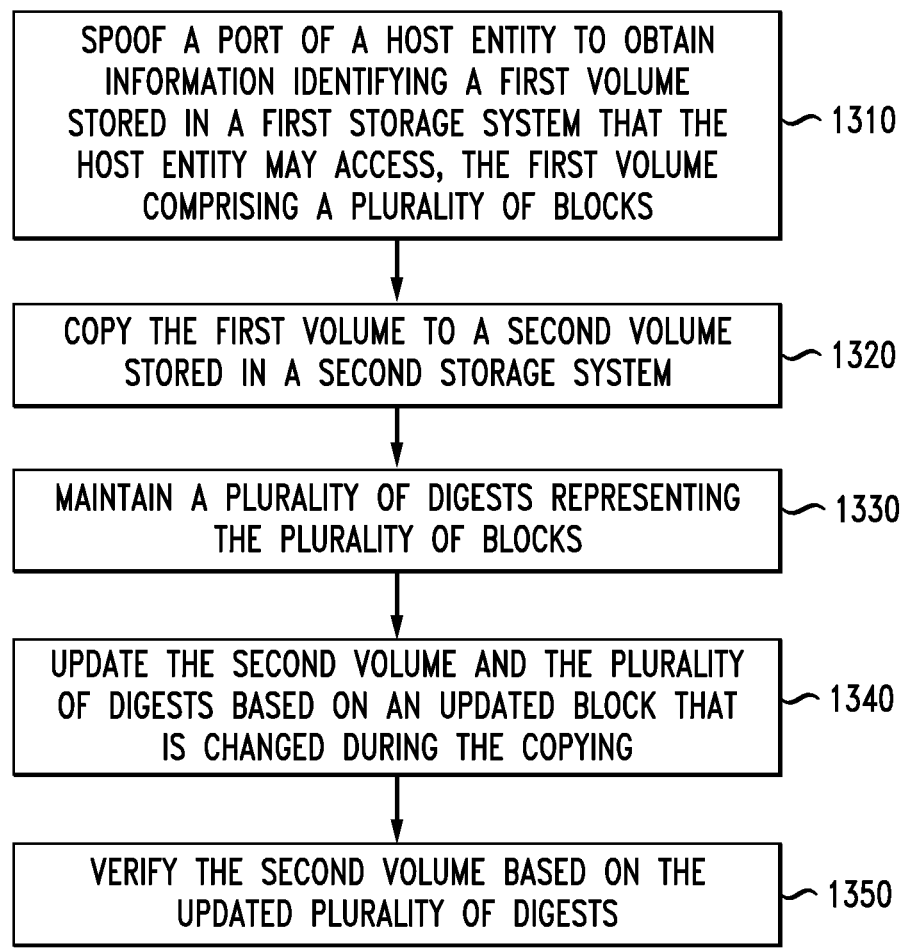
FIG. 13 is a flowchart of a method of copying data and verifying the copied data in accordance with an embodiment.

In the embodiment of FIG. 12, interceptor appliance 900 is inserted between, and is connected to, Fibre channel switch 1230 and server 1220. Interceptor process 910 (of interceptor appliance 900) spoofs selected components of network 1200 to obtain information concerning one or more host entities in the network and data stored in one or more storage systems in the network. For example, interceptor appliance 900 may identify server 1220 and one or more volumes stored in storage system 1265-A to which server 1220 has access. FIG. 13 is a flowchart of a method of copying data and verifying the copied data in accordance with an embodiment.

At step 1310, a port of a host entity is spoofed to obtain information identifying a first volume stored in a storage system that the host entity may access, the first volume comprising a plurality of blocks. In the illustrative embodiment of FIG. 12, interceptor process 910 (of interceptor appliance 900) identifies an initiator world wide port name of an initiator port of a host entity, such as server 1220, in a first registration procedure. Interceptor process 910 then spoofs the initiator port to obtain information from Fibre channel switch 1230. Specifically, the initiator world wide port name of the initiator port is added to the selected port of interceptor appliance 900. Interceptor appliance 900 transmits to Fibre channel switch 1230 a request for information identifying ports that are associated with the initiator port. Interceptor appliance 900 receives from Fibre channel switch 1230 information identifying a target port of one or more storage systems (which may include, for example, storage system 1265-A and/or storage system 1265-B) that are zoned to the initiator port of server 1220. Interceptor process 910 then identifies one or more storage volumes in the identified storage systems which server 1220 may access, based on the initiator world wide port name. Suppose, for example, that interceptor appliance 900 uses the methods described herein to determine that server 1220 has access to source volume 1283 stored in storage system 1265-A.

At step 1320, the first volume is copied to a second volume stored in a second storage system. Interceptor appliance 900 copies source volume 1283 to storage system 1265-B while allowing input/output operations directed to source volume 1283 to continue with little or no interruption. Referring to FIG. 9, data management service 930 (of interceptor appliance 900) identifies data blocks in source volume 1283 and commences a copy procedure. In a first pass of the copy procedure, data management service 930 copies each of the blocks from source volume 1283 to a destination volume 1285 stored in storage system 1265-B.

At step 1330, a plurality of digests representing the plurality of blocks is maintained. Thus, data management service 930 generates a hash value for each respective block copied during the first pass. Hash values are stored in hash table 970 maintained in memory 940, as shown in FIG. 9.

At step 1340, the second volume and the plurality of digests are updated based on an updated block that is changed during the copying. Data management service 930 uses second change map 977 to keep track of changes made to source volume 1283 during the first pass of the copy procedure. After the first pass, data management service 930 identifies blocks that were changed during the first pass, based on second change map 977, and copies the identified blocks in a second pass. Updated hash values are generated for each of the blocks copied during the second pass, and hash table 970 is updated to include the updated hash values. Changes made to source volume 1283 during the second pass are recorded in first change map 975. Additional passes are performed, as necessary, until a final pass is completed and a valid copy is generated.

At step 1350, the second volume is verified based on the updated plurality of digests. After data management service 930 completes the final pass of the copy procedure, data management service 930 uses hash table 970 to verify that destination volume 1285 is a valid copy of source volume 1283, in the manner described herein.

Figure 14:
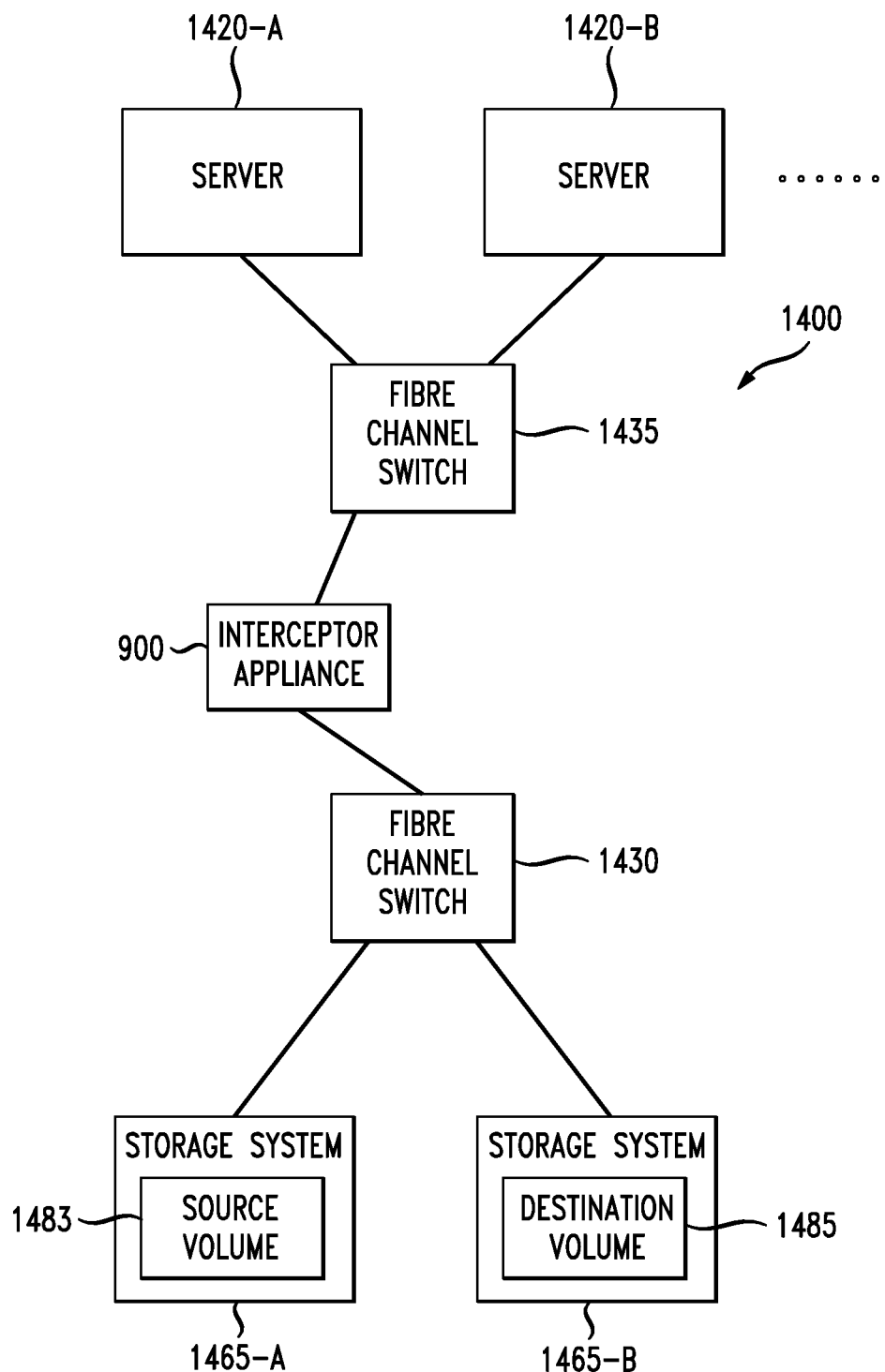
FIG. 14 shows a communications system in accordance with an embodiment.

FIG. 14 shows a communications system in accordance with another embodiment. Communication system 1400 comprises a Fibre channel network that includes a first Fibre channel switch 1430 and a second Fibre channel switch 1435. Fibre channel switch 1430 is connected to storage systems 1465-A and 1465-B. Fibre channel switch 1435 is connected to servers 1420-A and 1420-B. Interceptor appliance 900 is inserted in between Fibre channel switch 1430 and Fibre channel switch 1435. While two servers are shown in the embodiment of FIG. 14, more or fewer than two servers may be used. Similarly, while two storage systems are shown in the embodiment of FIG. 14, more or fewer than two storage systems may be used.

In the embodiment of FIG. 14, each component, including servers 1420, Fibre channel switches 1430 and 1435, interceptor appliance 900 and storage systems 1465, comprises one or more ports, which are used for communications with other devices. Each respective port has an identifier, such as a world wide port name.

In the embodiment of FIG. 14, interceptor appliance 900 is inserted between, and is connected to, Fibre channel switch 1430 and Fibre channel switch 1435. Interceptor process 910 (of interceptor appliance 900) spoofs selected components of communication system 1400 to obtain information concerning one or more host entities in the network and data stored in one or more storage systems in the network. For example, interceptor appliance 900 may identify server 1420-A and one or more volumes stored in storage system 1465-A to which server 1420-A has access.

In one embodiment, interceptor process 910 (of interceptor appliance 900) identifies an initiator world wide port name of an initiator port of a host entity, such as server 1420-A, in a first registration procedure. Interceptor process 910 then spoofs the initiator port to obtain information from Fibre channel switch 1430. Specifically, the initiator world wide port name of the initiator port is added to the selected port of interceptor appliance 900. Interceptor appliance 900 transmits to Fibre channel switch 1430 a request for information identifying ports that are associated with the initiator port. Interceptor appliance 900 receives from Fibre channel switch 1430 information identifying a target port of one or more storage systems (which may include, for example, storage system 1465-A and/or storage system 1465-B) that are zoned to the initiator port of server 1420-A. Interceptor process 910 then identifies one or more storage volumes in the identified storage systems which server 1420-A may access, based on the initiator world wide port name.

In the illustrative embodiment of FIG. 14, for example, interceptor appliance 900 may use the methods described herein to determine that server 1420-A has access to source volume 1483 stored in storage system 1465-A.

Interceptor appliance 900 may now employ systems, apparatus, and methods described herein to copy source volume 1483 to storage system 1465-B while allowing input/output operations directed to source volume 1483 to continue with little or no interruption. Referring to FIG. 9, data management service 930 (of interceptor appliance 900) identifies data blocks in source volume 1483 and commences a copy procedure. In a first pass of the copy procedure, data management service 930 copies each of the blocks from source volume 1483 to a destination volume 1485 stored in storage system 1465-B. Using systems and methods described herein, data management service 930 generates a hash value for each respective block copied during the first pass. Hash values are stored in hash table 970 maintained in memory 940, as shown in FIG. 9.

Data management service 930 uses second change map 977 to keep track of changes made to source volume 1483 during the first pass of the copy procedure. After the first pass, data management service 930 identifies blocks that were changed during the first pass, based on second change map 977, and copies the identified blocks in a second pass. Updated hash values are generated for each of the blocks copied during the second pass, and hash table 970 is updated to include the updated hash values. Changes made to source volume 1483 during the second pass are recorded in first change map 975. Additional passes are performed, as necessary, until a final pass is completed and a valid copy is generated.

After data management service 930 completes the final pass of the copy procedure, data management service 930 may use hash table 970 to verify that destination volume 1485 is a valid copy of source volume 1483 in the manner described herein.

Figure 15:
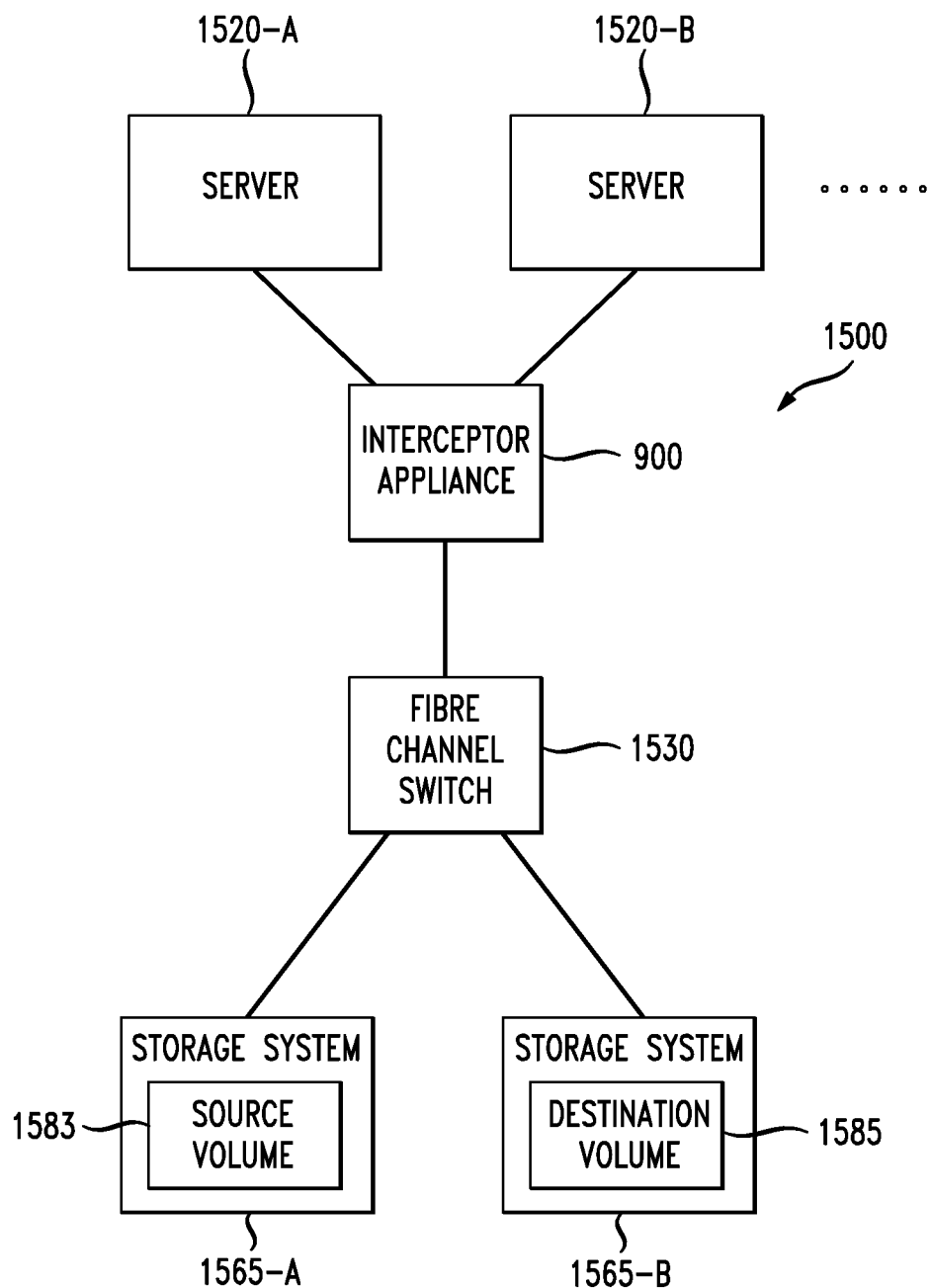
FIG. 15 shows a communications system in accordance with an embodiment.

FIG. 15 shows a communications system in accordance with another embodiment. Communication system 1500 comprises a Fibre channel network that includes a first Fibre channel switch 1530. Fibre channel switch 1530 is connected to storage systems 1565-A and 1565-B. Interceptor appliance 900 is connected to Fibre channel switch 1530, server 1520-A, and server 1520-B. While two servers are shown in the embodiment of FIG. 15, more or fewer than two servers may be used. Similarly, while two storage systems are shown in the embodiment of FIG. 15, more or fewer than two storage systems may be used.

In the embodiment of FIG. 15, each component, including servers 1520, Fibre channel switch 1530, interceptor appliance 900 and storage systems 1565, comprises one or more ports, which are used for communications with other devices. Each respective port has an identifier, such as a world wide port name.

In the embodiment of FIG. 15, interceptor process 910 (of interceptor appliance 900) spoofs selected components of communication system 1600 to obtain information concerning one or more host entities in the network and data stored in one or more storage systems in the network. For example, interceptor appliance 900 may identify server 1520-A and one or more volumes stored in storage system 1565-A to which server 1520-A has access.

In one embodiment, interceptor process 910 (of interceptor appliance 900) identifies an initiator world wide port name of an initiator port of a host entity, such as server 1520-A, in a first registration procedure. Interceptor process 910 then spoofs the initiator port to obtain information from Fibre channel switch 1530. Specifically, the initiator world wide port name of the initiator port is added to the selected port of interceptor appliance 900. Interceptor appliance 900 transmits to Fibre channel switch 1530 a request for information identifying ports that are associated with the initiator port. Interceptor appliance 900 receives from Fibre channel switch 1530 information identifying a target port of one or more storage systems (which may include, for example, storage system 1565-A and/or storage system 1565-B) that are zoned to the initiator port of server 1520-A. Interceptor process 910 then identifies one or more storage volumes in the identified storage systems which server 1520-A may access, based on the initiator world wide port name.

In the illustrative embodiment of FIG. 15, for example, interceptor appliance 900 may use the methods described herein to determine that server 1520-A has access to source volume 1583 stored in storage system 1565-A.

Interceptor appliance 900 may now employ systems, apparatus, and methods described herein to copy source volume 1583 to storage system 1565-B while allowing input/output operations directed to source volume 1583 to continue with little or no interruption. Referring to FIG. 9, data management service 930 (of interceptor appliance 900) identifies data blocks in source volume 1583 and commences a copy procedure. In a first pass of the copy procedure, data management service 930 copies each of the blocks from source volume 1583 to a destination volume 1585 stored in storage system 1565-B. Using systems and methods described herein, data management service 930 generates a hash value for each respective block copied during the first pass. Hash values are stored in hash table 970 maintained in memory 940, as shown in FIG. 9.

Data management service 930 uses second change map 977 to keep track of changes made to source volume 1583 during the first pass of the copy procedure. After the first pass, data management service 930 identifies blocks that were changed during the first pass, based on second change map 977, and copies the identified blocks in a second pass. Updated hash values are generated for each of the blocks copied during the second pass, and hash table 970 is updated to include the updated hash values. Changes made to source volume 1583 during the second pass are recorded in first change map 975. Additional passes are performed, as necessary, until a final pass is completed and a valid copy is generated.

After data management service 930 completes the final pass of the copy procedure, data management service 930 may use hash table 970 to verify that destination volume 1585 is a valid copy of source volume 1583 in the manner described herein.

In various embodiments, the method steps described herein, including the method steps described in FIGS. 3, 5A-5B, 11 and/or 13, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 3, 5A-5B, 11 and/or 13, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 16:
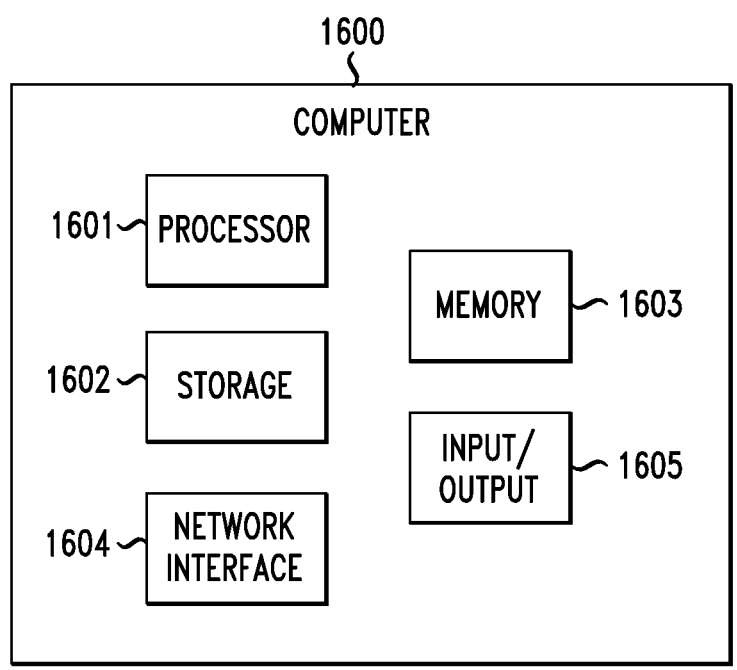
FIG. 16 shows an exemplary computer that may be used to implement certain embodiments of the invention.

A high-level block diagram of an exemplary computer that may be used to implement systems, apparatus and methods described herein is illustrated in FIG. 16. Computer 1600 includes a processor 1601 operatively coupled to a data storage device 1602 and a memory 1603. Processor 1601 controls the overall operation of computer 1600 by executing computer program instructions that define such operations. The computer program instructions may be stored in data storage device 1602, or other computer readable medium, and loaded into memory 1603 when execution of the computer program instructions is desired. Thus, the method steps of FIGS. 3, 5A-5B, 11 and/or 13 can be defined by the computer program instructions stored in memory 1603 and/or data storage device 1602 and controlled by the processor 1601 executing the computer program instructions. For example, the computer program instructions can be implemented as computer executable code programmed by one skilled in the art to perform an algorithm defined by the method steps of FIGS. 3, 5A-5B, 11 and/or 13. Accordingly, by executing the computer program instructions, the processor 1601 executes an algorithm defined by the method steps of FIGS. 3, 5A-5B, 11 and/or 13. Computer 1600 also includes one or more network interfaces 1604 for communicating with other devices via a network. Computer 1600 also includes one or more input/output devices 1605 that enable user interaction with computer 1600 (e.g., display, keyboard, mouse, speakers, buttons, etc.).

Processor 1601 may include both general and special purpose microprocessors, and may be the sole processor or one of multiple processors of computer 1600. Processor 1601 may include one or more central processing units (CPUs), for example. Processor 1601, data storage device 1602, and/or memory 1603 may include, be supplemented by, or incorporated in, one or more application-specific integrated circuits (ASICs) and/or one or more field programmable gate arrays (FPGAs).

Data storage device 1602 and memory 1603 each include a tangible non-transitory computer readable storage medium. Data storage device 1602, and memory 1603, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1605 may include peripherals, such as a printer, scanner, display screen, etc. For example, input/output devices 1605 may include a display device such as a cathode ray tube (CRT) or liquid crystal display (LCD) monitor for displaying information to the user, a keyboard, and a pointing device such as a mouse or a trackball by which the user can provide input to computer 1600.

Any or all of the systems and apparatus discussed herein, including server 160, data manager 120, storage 165, storage 172, interceptor appliance 900, servers 1020, 1220, and 1420, Fibre channel switches 1030, 1230, 1430, and 1435, storage systems 1065, 1265, and 1465, and components thereof, including data management service 235, memory 260, data management service 930, memory 940, and interceptor process 910, and all ports associated with any of these apparatus or components, may be implemented using a computer such as computer 1600.

One skilled in the art will recognize that an implementation of an actual computer or computer system may have other structures and may contain other components as well, and that FIG. 16 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of copying data and verifying the copied data, the method comprising:
    copying a plurality of blocks from a first volume stored in a first location to a second volume stored in a second location;
    storing a plurality of hash values representing the plurality of blocks;
    performing one or more write operations with respect to selected blocks in the first volume during copying of data from the first volume to the second volume, to generate one or more updated blocks;
    updating the plurality of hash values to include one or more updated hash values representing the one or more updated blocks;
    copying the one or more updated blocks from the first volume to the second volume;
    determining that an expected time associated with updating the plurality of hash values to include second updated hash values representing one or more second updated blocks and copying the one or more second updated blocks from the first volume to the second volume is less than a predetermined limit;
    pausing input/output operations with respect to the first volume during a selected time period, in response to the determining; and
    updating the plurality of hash values to include the second updated hash values and copying the one or more second updated blocks from the first volume to the second volume, during the selected time period.

2. The method of claim 1, further comprising:
    verifying the second volume based on the updated plurality of hash values.

3. The method of claim 2, wherein verifying the second volume based on the updated plurality of hash values further comprises:
    generating a verification hash value based on a copied block stored in the second volume; and
    comparing the verification hash value to a hash value selected from the updated plurality of hash values.

4. The method of claim 1, further comprising:
    recording a location of the one or more write operations in a change map; and
    updating the plurality of hash values and copying the one or more updated blocks from the first volume to the second volume, based on the change map.

5. The method of claim 4, further comprising:
    performing a second write operation with respect to a third selected block in the first volume, generating a third updated block, during copying of the one or more updated blocks;
    recording in a second change map a location of the second write operation; and
    updating the plurality of hash values and copying the third updated block from the first volume to the second volume based on the second change map.

6. A method of verifying data copied from a dynamic volume, the method comprising:
    copying a source volume to generate a destination volume, the source volume comprising a plurality of blocks;
    generating a plurality of digests representing the plurality of blocks;
    updating the plurality of digests to include updated digests representing one or more selected blocks of the source volume that were changed during copying of the source volume;
    copying to the destination volume the one or more selected blocks; and
    verifying the destination volume based on the updated plurality of digests;
    the method further comprising:
        recording, in a first change map, information identifying the selected blocks;
        updating the plurality of digests and copying the one or more selected blocks, based on the first change map;
        recording, in a second change map, information identifying second blocks changed during copying of data from the source volume to the destination volume;
        determining that an expected time required to update the plurality of digests, based on the second blocks, and to copy the second blocks from the source volume to the destination volume, is less than a predetermined limit;
        pausing input/output operations with respect to the source volume during a selected time period, in response to the determining; and
        updating the plurality of digests, based on the second blocks, and copying the second blocks from the source volume to the destination volume, during the selected time period.

7. A device comprising:
    a memory storing computer program instructions; and
    a processor configured to execute the computer program instructions which, when executed on the processor, cause the processor to perform operations comprising:
        copying a source volume to generate a destination volume, the source volume comprising a plurality of blocks;
        generating a plurality of digests representing the plurality of blocks;
        updating the plurality of digests to include updated digests representing one or more selected blocks of the source volume that were changed during copying of the source volume;
        copying to the destination volume the one or more selected blocks; and
        verifying the destination volume based on the updated plurality of digests;
    the operations further comprising:
        recording, in a first change map, information identifying the selected blocks;
        updating the plurality of digests and copying the one or more selected blocks, based on the first change map;

recording, in a second change map, information identifying second blocks changed during copying of data from the source volume to the destination volume;

determining that an expected time required to update the plurality of digests, based on the second blocks, and to copy the second blocks from the source volume to the destination volume, is less than a predetermined limit;

pausing input/output operations with respect to the source volume during a selected time period, in response to the determining; and updating the plurality of digests, based on the second blocks, and copying the second blocks from the source volume to the destination volume, during the selected time period.

* * * * *